Oct. 9, 1951 H. M. HANSON 2,571,032
AUTOMATIC POULTRY SCALDING APPARATUS
Filed Aug. 5, 1948 2 Sheets-Sheet 1

INVENTOR.
HENRY M. HANSON
BY
ATTORNEY

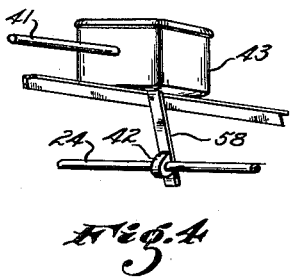
Fig. 4
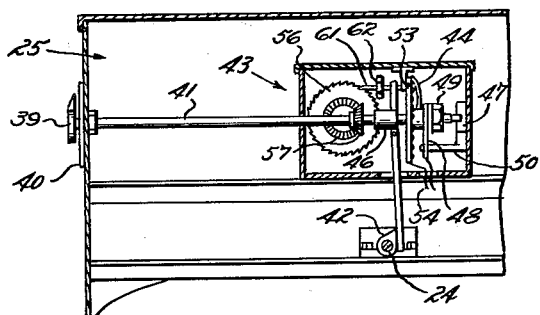
Fig. 5
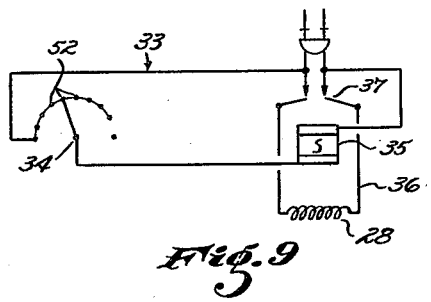
Fig. 9
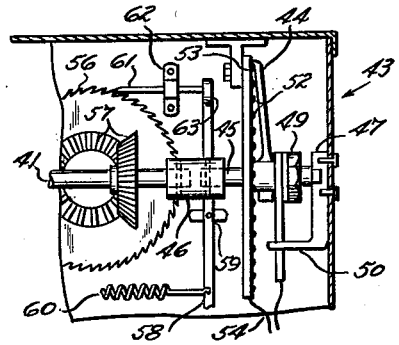
Fig. 6
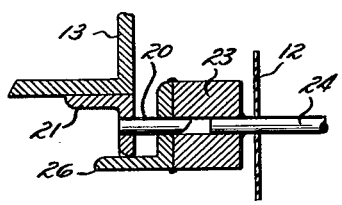
Fig. 10
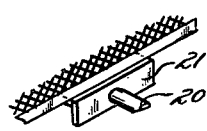
Fig. 11
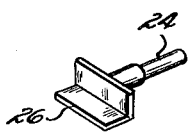
Fig. 12
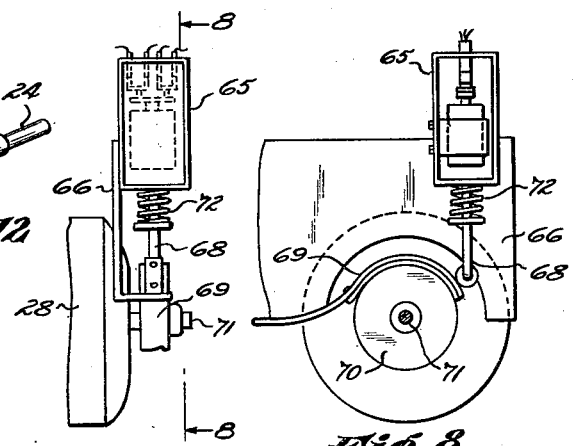
Fig. 7
Fig. 8
Fig. 14
Fig. 13
INVENTOR.
HENRY M. HANSON
BY Stuart M. Traule
ATTORNEY Patented Oct. 9, 1951

2,571,032

UNITED STATES PATENT OFFICE 2,571,032

AUTOMATIC POULTRY SCALDING APPARATUS

Henry M. Hanson, Glendora, Calif., assignor to Gordon L. Stith, Glendora, Calif.

Application August 5, 1948, Serial No. 42,602

10 Claims. (Cl. 17—11.2)

This invention relates to machines for and methods of scalding poultry, as a step preliminary to plucking said poultry, for the purpose of loosening the feathers to make the plucking operation more rapid and effective, and to minimize the tendency for the plucking operation to harm the skin and flesh of the poultry.

An object of the present invention is to provide means whereby a large number of fowl may be scalded simultaneously and under controlled optimum conditions.

Hitherto the preparation of poultry for marketing has been largely a matter of operations individual to each fowl, including the successive steps of slaughtering, scalding, and plucking, in which each step has consumed more time than the preceding step and therefore has either imposed an operational bottleneck or has required additional operatives to perform it. More recently, to the end of breaking one of these bottlenecks, plucking machines have been devised which pluck the feathers from a scalded fowl in much less time than was formerly required. The time required to pluck a properly scalded fowl may now be reduced to ten or twelve seconds, but it will be noted that the plucking operation is still individual to one fowl at a time. Moreover, mass production is still limited by the slowness of the preceding operation for which the standard is forty to fifty seconds at 120 degrees Fahrenheit for semi-scalded fowl intended for cold storage, and fifty to sixty seconds at 140 degrees for hard-scalded fowl intended for immediate marketing.

The time-honored method of scalding fowl is to grasp an individual fowl by the legs and continuously dip it into and raise it from a pail of hot water, as that method allows the heat to work to the best advantage on the feathers while leaving the skin as cool as possible. Such a method is obviously inordinately slow for commercial production, and commercial slaughterers therefore commonly place a number of fowl in a tub or vat of hot water and stir them around, thereby gaining in time but losing in quality. With continuous exposure to hot water, the skins of the fowl are apt to be semi-cooked before the feathers are adequately softened and loosened.

It is therefore another object of this invention to provide a scalding machine which will alternately dip and drain a large number of fowl simultaneously and so obtain the advantages of both hand scalding and mass scalding.

A further object of the invention is to provide automatic timing mechanism for a machine of the above-described character, whereby successive batches of fowl may receive scalding of like duration, or may have the duration of scalding altered to suit temperature conditions and the intended subsequent storage of the fowl.

Still another object of the invention is to provide a scalding machine which may easily and quickly be loaded with and emptied of a batch of fowl and which has means associated with its timing mechanism for stopping the load carrier in a readily accessible position.

The invention possesses other objects and features of advantage, some of which, with the foregoing, will be set forth in the following description of the preferred form of my invention which is illustrated in the drawings accompanying and forming part of the specification. It is to be understood that I do not limit myself to the showing made by the said drawings and description, as I may adopt variations of the preferred form within the scope of my invention as set forth in the claims.

Referring to the drawings:

Figure 4 is a fragmentary perspective view showing the mounting of the timing control mechanism.

Figure 5 is a vertical transverse section on an enlarged scale, illustrating details of the timing control mechanism shown in Figure 4, the plane of section being indicated by the line 5—5 of Figure 1, with the direction of view as indicated.

Figure 6 is a further enlarged fragmentary view of a portion of the mechanism shown in Figure 5.

Figure 7 is a vertical transverse section on an enlarged scale illustrating details of the motor control, the plane of section being indicated by the line 7—7 of Figure 1, with the direction of view as indicated.

Figure 8 is a vertical sectional view taken at a right angle to the view of Figure 7, with the plane of section indicated by the line 8—8 of Figure 7.

Figure 9 is a diagrammatic view of the electric circuits of the machine.

Figure 10 is an enlarged detail view in longitudinal vertical section, showing the manner of interconnection between the basket and the motor driven drive shaft.

Figure 11 is a detail view in perspective of the basket-supporting trunnion of Figure 10.

Figure 12 is a perspective view of the driven arm carried by the drive shaft of Figure 10.

Figure 13 is a perspective view of the trunnion associated with the opposite end of the basket.

Figure 14 is a perspective view of the the tail-bearing yoke for the removable and revoluble support of the trunnion of Figure 13.

Figure 1:
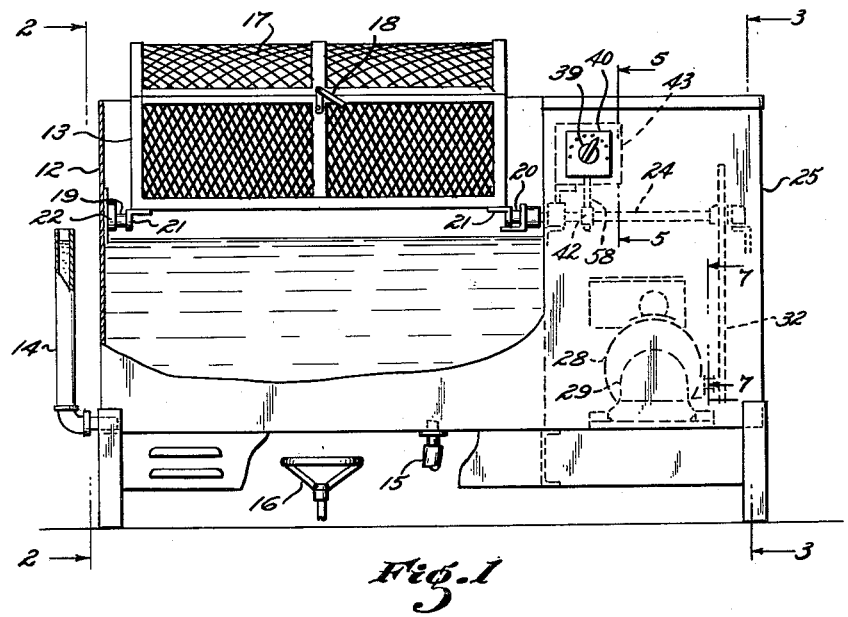
Figure 1 is a frontal elevational view partly broken away to reveal interior construction of a scalding machine embodying the principles of this invention.
Figures 2, 3:
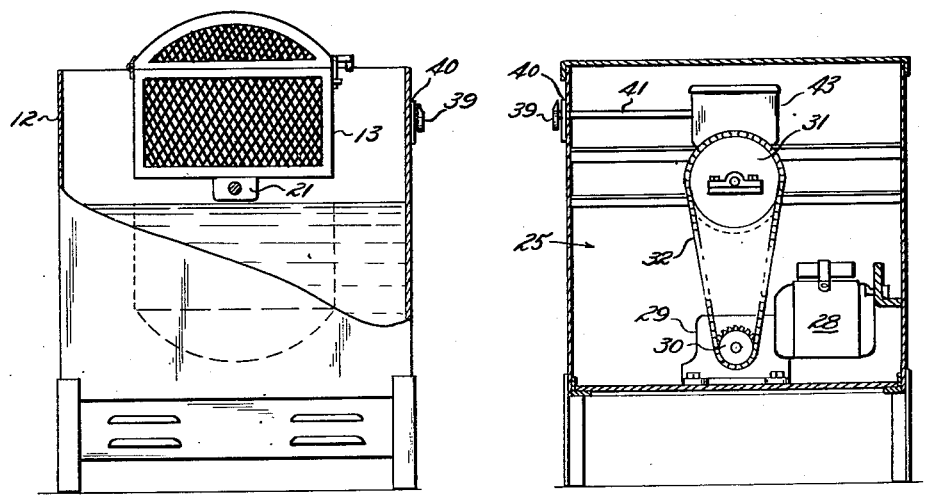
Figure 2 is an end elevational view, partly broken away, of the load-carrying portion of the machine, the direction of view being indicated by the arrows 2—2 of Figure 1.
Figure 3 is a vertical transverse section of the portion of the machine containing the driving and controlling mechanism, the plane of section being indicated by the line 3—3 of Figure 1, with the direction of view as indicated and with the basket omitted.

Specifically describing that embodiment of my invention which has been chosen for illustration and description herein, my poultry scalding machine comprises a tank 12 for containing water, and a container or basket 13 mounted so as to be rotatable within the tank 12 upon a horizontal axis. The tank 12 is provided with an overflow 14 and drain 15, and may be filled by any convenient means, such as a hose. If desired, hot water may be circulated therethrough. Preferably, for the maintenance of a desired temperature, heating means, such as a gas burner 16, are provided which may be controlled by any suitable thermostatic device (not shown). The basket 13 is preferably elongated and narrow and may be of any perforated or screen-mesh construction adapted to admit water rapidly and to allow water to drain with similar facility, and has a lid 17 provided with fastening means, such as a latch 18.

The basket 13 is mounted for rotation within the tank 12 and about an axis extending longitudinally thereof by means of a pair of axially aligned trunnions 19 and 20 associated respectively with the opposite ends of the basket. Each of these trunnions is carried by the downwardly extending flange of an angle bracket 21 rigidly affixed to the bottom of a basket 13. The trunnion 19 is adapted to rest within a U-shaped yoke 22 mounted rigidly upon the inner face of an end wall of the tank 12; and since this yoke opens upwardly, it serves not only as a bearing for the revoluble support of the basket, but it also permits the basket to be lifted vertically upwards for the purpose of removal of the basket from the tank. The other trunnion 20 is relieved at its outer end so as to facilitate insertion of the trunnion 20 into a socket 23 which is carried rigidly upon the end of a drive shaft 24 which extends through a wall of the tank 12 into a cabinet 25.

To the outer end of the socket 23, one flange of a piece of angle is rigidly secured; and the other flange 26 extends outwards in position to be engaged by the edge of the vertical flange of the angle 21 which carries the trunnion 20, and thus interconnect the basket 13 and the shaft 24 for simultaneous rotation. Thus it may be seen that the weight of the basket 13 and its contents is supported upon the trunnions 19 and 20, the latter being supported by and connected to the drive shaft 24 to be rotated thereby since the angle carried by the trunnion 20 operates as a crank engaging the basket in such a manner as to effect rotation of the basket with the shaft 24.

A motor 28 is mounted in the cabinet 25 and drives the shaft 24 through a reduction gear 29, sprockets 30 and 31, and chain 32, so as to cause rotation of the basket 13 at a rate preferably between twenty and forty revolutions per minute. The electric circuits governing and supplying power to the motor 28 (see Figure 9) comprise a first circuit 33 which includes a control switch 34 and an electromagnet 35, and a second circuit 36 which includes the motor 28 and a switch 37 operated by the electromagnet 35.

The control switch 34 is arranged to be set manually by an indicator handle 39 mounted on a dial 40 on the cabinet 25 and connected to the switch by a shaft 41, and to be moved mechanically by mechanism responsive to rotation of a cam 42 on the shaft 24. As a further precaution against dampness, the control switch 34 and its operating mechanism are preferably housed in a switch box 43 within the cabinet 25. The switch 34 has a conductor finger 44 mounted on an extension 45 of the shaft 41. The extension shaft 45 is connected to the shaft 41 by a coupling 46 of electrically insulating material and is supported at its other end by a thrust bearing 47, also of insulated construction, secured to the switch box 43. A lead-off arm 48 is mounted rotatably on the extension shaft 45 to form a brush contact with the finger 44, and may be held in contact with the finger by a nut 49 threaded on the extension shaft 45 and held against rotation by a guide finger 50 which may be a part of the thrust bearing 47.

The finger 44 may be swung arcuately by rotation of the shaft 41 and makes contact with a series of electrically connected contact points 52 on a plate 53 secured to the switch box 43. The contact points 52 are connected to the lead-in wire 54 of the circuit 33. The contact points 52 therefore provide a series of circuit-closing positions for the control switch 34, and the remainder of the arc of travel of the finger 44 beyond the contact points 52 constitutes an open position for the control switch. The dial 40 is calibrated to accord with the contact points 52 so that by setting the indicator handle 39 at a given calibration, a certain number of contact points 52 must be successively contacted by the finger 44 before the finger arrives at the circuit-opening position.

To provide mechanical rotation of the finger 44, a ratchet wheel 56 is mounted in the switch box 43 and is connected to the shaft 41 by bevel gears 57. A lever 58 is pivotally mounted in the switch box 43, as on a pin 59, and is urged by a spring 60 into contact at its lower end with the cam 42. A pawl 61 is slidably mounted in a guide 62, secured to the switch box 43, so as to have one of its ends engage the ratchet wheel 56 and its other end engaged in a slot 63 in the lever 58, the pawl thereby being permitted longitudinal movement while the lever is permitted arcuate movement. The pawl 61 is of spring material and adapted to thrust against the teeth of the ratchet wheel 56 to rotate the wheel and to move by spring action to the next following tooth when moved rearwardly by the lever 58. By this construction, each rotation of the cam 42, coinciding with a rotation of the basket 13, causes the ratchet wheel 56 to advance by one tooth, and the finger 44 to move from one to another of the contact points 52 and eventually to reach the circuit-breaking position.

When the circuit 33 is closed by contact of the finger 44 with any of the contact points 52, the electromagnet 35 is activated to cause closure of the switch 37 and thereby permit electric current to reach and operate the motor 28. The electromagnet 35 and switch 37 are preferably enclosed in a switch box 65 mounted on a plate 66 secured to the housing of the motor 28, and the switch 37 is preferably of the double-contact type to insure electric contact under possibly damp conditions.

The electromagnet 35 preferably is connected by an arm 68 to a brake 69 operating on a brake drum 70 mounted on the shaft 71 of the motor 28. When the electromagnet 35 is activated, it exerts tension on the arm 68 to release the brake 69 from the brake drum 70 against the resistance of a spring 72. Inactivation of the electromagnet 35 permits the spring 72 to return the brake 69 into contact with the brake drum 70, to overcome the rotative inertia of the motor 28 and the basket 13 and to bring the basket to a prompt halt. The cam 42 is so placed on the shaft 24 in relation to the position occupied by the basket 13 when operably connected thereto by the hereinabove described interengagement between the flange 26 with its associated bracket 21, that the finger 44 is moved from one contact point 52 to another thereof, and from the last contact point in the series to the open position of the switch 34 as the basket 13 approaches an upright position in which the lid 17 is uppermost. The final mechanical movement of the finger 44 causes immediate application of the brake 69, so as to halt the basket at the desired point of rotation.

To scald poultry with the above-described machine, a plurality of baskets 13 may be used, each basket being packed and unpacked with fowl at some convenient station. The water level in the tank 12 is preferably maintained approximately at the level of the axis of the basket's rotation, as indicated by the position of the overflow pipe 14. A basket 13 packed with fowl is lowered into the tank 12, with first its trunnion 19 being guided into the socket 23 and then the trunnion 20 into the yoke 22. The indicator handle 39 is then turned to a calibration indicative of the number of revolutions which it is desired that the basket 13 should rotate. This sets the control switch 34 at a corresponding closed position in the series of contact points 52 and starts the motor 28 and releases the brake 69.

At each revolution of the basket 13, all the fowl in the basket are successively dipped into the hot water in the tank 12 and raised above the water to drain as each sector of the basket is successively swung through the lower and upper arcs of its rotative course. As the speed of the motor is substantially constant, the immersion periods, and likewise the draining periods, are of substantially equal duration, and the immersion periods and drainage periods will be approximately equal to each other when the water level is maintained at the level of the bearings 23, and may be varied with respect to each other over a considerable percentage range by slight changes in the water level. The preferred narrow shape of the basket permits hot water to reach the center of the basket rapidly and to drain therefrom freely, and if the basket is not packed completely full, the fowl will be jostled therein so as to drain more effectively.

The pawl and ratchet herein described as a preferred means of mechanically moving the control switch 34 permit movement of the switch in only one direction, which as herein illustrated is clockwise, as viewed by an operator facing the dial 40. The operator will therefore move the indicator handle 39 clockwise from the circuit-opening position to the highest calibration of the dial 40 and onwardly clockwise to the desired calibration. The machine will start as soon as contact is made between the finger 44 and the first-reached contact point 52, but will rotate only the number of revolutions corresponding to the position in which the indicator handle is left. When the last of these revolutions has been approximately completed, the motor will stop and the brake 69 will bring the basket to a rapid halt in substantially the position in which it started. If the cam 42 is so disposed that the error, if any, in stopping the basket in a vertical position is on the side of an uncompleted revolution rather than an over-completed revolution, the operator may easily bring the basket to the vertical by a quick rotation of the indicator handle 39 through a complete turn. The basket 13 containing scalded fowl may then be lifted from the trough 12 and be replaced by another basket.

With the scalding machine herein described, I have found it possible to obtain a hard scald, suitable for fowl which are to be immediately marketed, in a maximum of sixty seconds of operation at 140 degrees temperature, with the machine timed to make a revolution in two seconds, thus providing thirty dips and thirty drains of approximately one second duration each. With similar timing, a suitable semi-scald may be obtained in a maximum of forty seconds at 128 degrees temperature, providing twenty dips and twenty draining periods of approximately one second each. The number of contact points 52 is therefore preferably about thirty, or a little over, to allow for exceptional conditions, with the dial 40 correspondingly marked.

I claim:

1. A machine for scalding poultry, comprising a tank, a basket rotatable in said tank upon an axis disposed eccentrically to the volumetric axis of said basket, an electric motor operatively connected with said basket to cause rotation thereof, and means operatively associated with said basket in synchronism therewith for inactivating said motor upon completion of a predetermined number of revolutions of said basket.

2. A machine for scalding poultry, as set forth in claim 1, in which said inactivating means include a cam rotatable with said basket, a ratchet, a pawl engaging said ratchet and actuable by said cam to cause intermittent movements of said ratchet corresponding to rotations of said cam, a switch controlling the circuit of said motor and having a series of closed positions and an open position and adapted to move in response to movements of said ratchet through said series of closed positions to said open position, and means for setting said switch selectively at positions in said closed series.

3. A machine for scalding poultry, as set forth in claim 1, with the addition of a brake adapted to restrain the rotation of said basket and actuable by said inactivating means whereby said basket is brought to a prompt halt when said motor is inactivated.

4. A machine for scalding poultry, comprising a tank for hot water, a basket rotatable in said tank upon an axis so disposed with relation to the volumetric axis of said basket and to the normal water level in said tank that rotation of said basket causes the major portion of said basket to be alternately lowered below and raised above said water level, an electric motor operatively connected to said basket to cause rotation thereof, and means operatively associated with said basket responsive to rotation for breaking the electric circuit to said motor when said basket has completed a predetermined number of revolutions and has attained a position in which said major portion of said basket is raised above said water level.

5. A machine for scalding poultry, as set forth in claim 4, in which said circuit breaking means include a cam rotatable with said basket, and switch means actuable by said cam for breaking said circuit, said basket being so disposed relative to said cam that the major portion of said basket is above the water level in said tank when said circuit is broken.

6. A machine for scalding poultry, as set forth in claim 5, having in addition means responsive to the breaking of said circuit for obviating the tendency of said basket to continue to rotate by inertia.

7. A machine for scalding poultry, comprising a tank for hot water, a basket having a closure and rotatable in said tank so as to bring said closure alternately below and above the normal water level in said tank, an electric motor operatively connected to said basket to cause rotation thereof, means co-operatively associated and synchronized with said basket for breaking the electric circuit to said motor when said basket has completed a predetermined number of revolutions, and means actuable by said circuit breaking means for obviating the tendency of said basket to continue to rotate by inertia.

8. A machine for scalding poultry, as set forth in claim 7, in which said basket has a pair of axially aligned trunnions defining an axis of rotation, and said tank has a bearing opening upwardly optionally to receive one of said trunnions therein or to permit removal of said trunnion therefrom, the other of said trunnions having means defining a crank engageable with said basket to effect rotation of said basket thereby.

9. A machine for scalding poultry, comprising a tank for hot water, a basket having a closure and rotatable in said tank so as to bring said closure alternately below and above the normal water level in said tank, an electric motor operatively connected to said basket to cause rotation thereof, a first electric circuit including an electromagnet and a first switch having a series of closed positions and an open position, a second electric circuit including said motor and a second switch adapted to be closed by activation of said electromagnet, means operably connected to said first switch for setting said first switch selectively at positions in said closed series so as to activate said electromagnet, whereby said second switch is closed and said motor is caused to rotate said basket, and means responsive to rotation of said basket for moving said first switch progressively through said series of closed positions to said open position so as then to inactivate said electromagnet and to open said second switch.

10. A machine for scalding poultry, as set forth in claim 9, and having additionally a brake operable to reduce the rotational inertia of said basket and connected to said electromagnet so as to be so operable when said electromagnet is inactive and to be released when said electromagnet is activated.

HENRY M. HANSON.

REFERENCES CITED

The following references are of record in the file of this patent:

UNITED STATES PATENTS

| Number | Name | Date |
| --- | --- | --- |
| 382,977 | Harmel | May 15, 1888 |
| 2,326,162 | O'Conner et al. | Aug. 10, 1943 |
| 2,408,248 | Barber | Sept. 24, 1946 |

FOREIGN PATENTS

| Number | Country | Date |
| --- | --- | --- |
| 373,281 | Germany | Apr. 10, 1923 |